June 12, 1934.   L. B. WHITMARSH   1,962,799
CATTLE SKINNING CRADLE
Filed Nov. 9, 1931   2 Sheets-Sheet 2
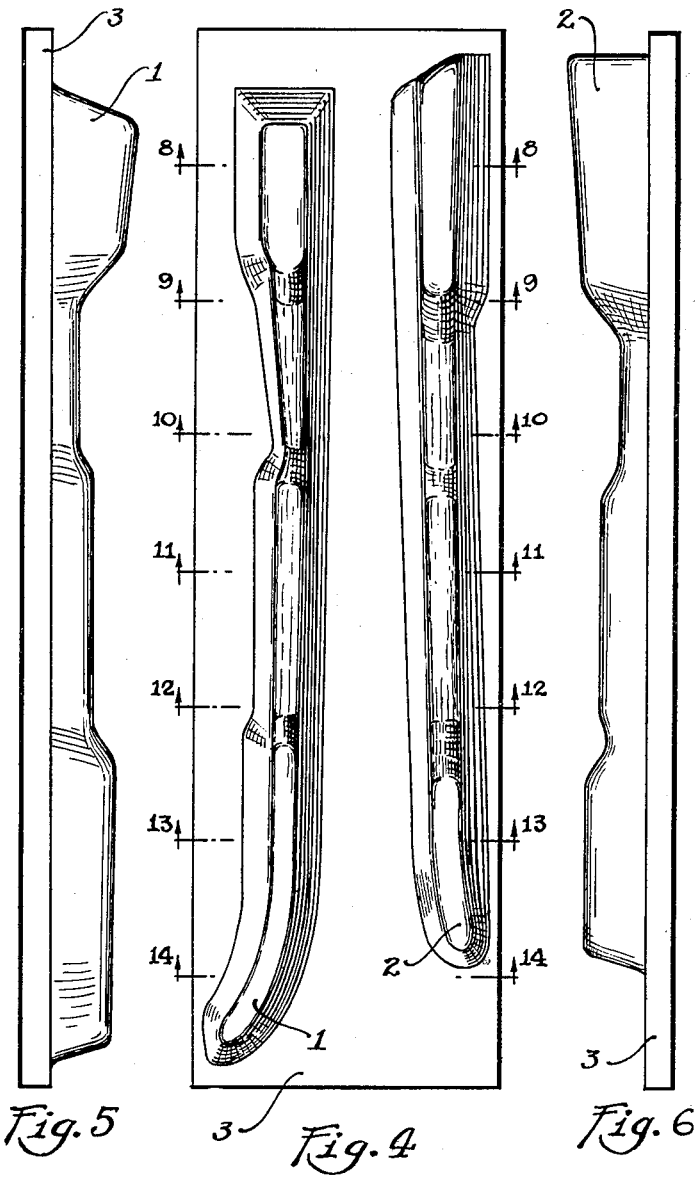
Fig. 5   Fig. 4   Fig. 6
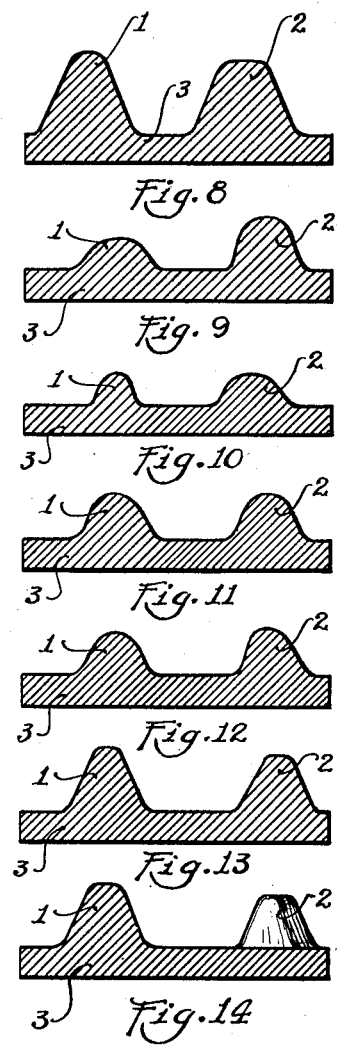
Fig. 8
Fig. 9
Fig. 10
Fig. 11
Fig. 12
Fig. 13
Fig. 14
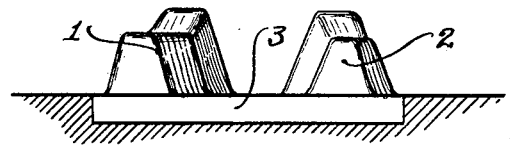
Fig. 7
Laurance B. Whitmarsh
INVENTOR
BY
ATTORNEY
WITNESS Patented June 12, 1934

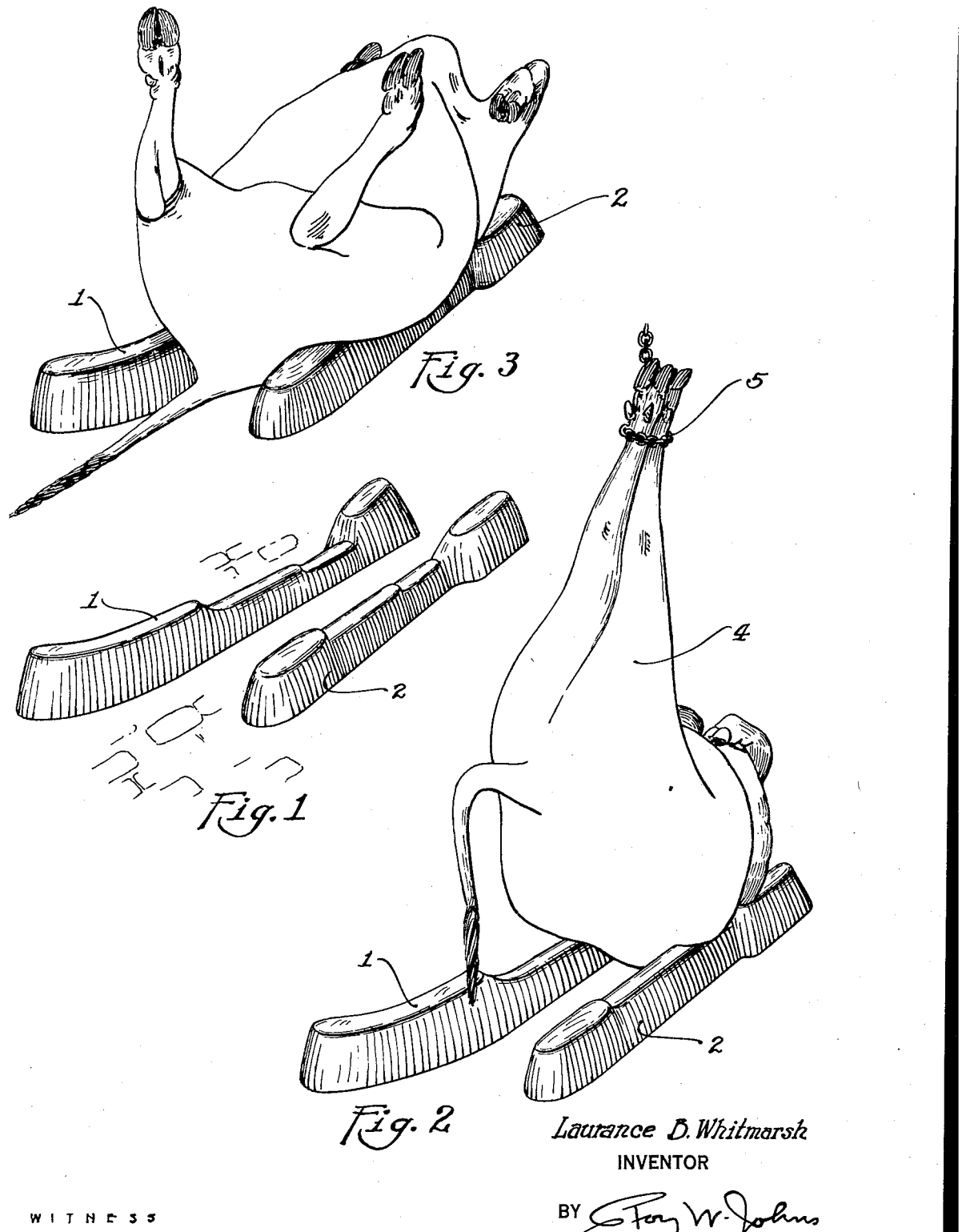

1,962,799

UNITED STATES PATENT OFFICE 1,962,799

CATTLE-SKINNING CRADLE

Laurance B. Whitmarsh, Chicago, Ill., assignor to Industrial Patents Corporation, Chicago, Ill., a corporation of Delaware Application November 9, 1931, Serial No. 573,825

2 Claims. (Cl. 17—44)

This invention relates to a device especially designed for installation on the floor, adjacent to the beef killing beds, of an abattoir and more particularly to a device designed to hold a beef carcass in proper position for the removal of the hide.

One of the objects of this invention is to provide a cradle for holding the carcass firmly in the proper position and yet permit such movement as may be desirable during the skinning operation.

Another object of the invention is to provide a skinning cradle which will permit ready access to the carcass by the floorsmen.

Another object of the invention is to provide a skinning cradle upon which the carcass may be readily placed and from which the carcass may be readily removed with a minimum of labor and without damage to the carcass.

Other objects of the invention will be apparent from the description and claims which follow.

Referring now to the drawings in which—

Figure 1 is a perspective view of the preferred embodiment of the invention installed on the floor.

Figure 2 is a perspective view of a carcass being lowered into the cradle.

Figure 3 is a perspective view of a beef carcass in the cradle.

Figure 4 is a plan view of the cradle.

Figure 5 is a side view of wing 1.

Figure 6 is a side view of wing 2.

Figure 7 is a front view of the preferred embodiment of the invention shown in plan in Figure 4.

Figure 8 is a sectional view through 8—8 of Figure 4.

Figure 9 is a sectional view through 9—9 of Figure 4.

Figure 10 is a sectional view through 10—10 of Figure 4.

Figure 11 is a sectional view through 11—11 of Figure 4.

Figure 12 is a sectional view through 12—12 of Figure 4.

Figure 13 is a sectional view through 13—13 of Figure 4.

Figure 14 is a sectional view through 14—14 of Figure 4.

The wings 1 and 2 may or may not be rigidly affixed to a foundation plate 3.

The cradle may be made of wood or molded in concrete with or without reenforced steel, or cast in iron, or formed of any other desirable material.

It will be seen, of course, that the cradle may be manufactured separately or molded as an integral part of the floor.

As is well known, it is the conventional practice in slaughter houses to slaughter and bleed the animal on the killing bed, the stunned animal being suspended by a shackling chain fastened to the hind feet. The carcass, after bleeding, is removed to an adjacent portion of the floor and lowered upon the pritch plates which, as is also well known, are ordinarily made of steel provided with wavy corrugations adapted to permit holding the animal in position with pritch sticks, one pritch stick being used on each side of the carcass.

Pritch plates are difficult to clean and, because of the presence of blood and other animal fluids, deteriorate rapidly. Pritch sticks are also undesirable in that the pointed ends often damage the hide.

The cradle of the present invention permits elimination of the corrugated pritch plates and provides a sanitary easily cleaned support for holding the carcass in proper position for skinning.

In conventional skinning with pritch sticks, after the hide has been removed from the side of a carcass the pritch stick must be readjusted bringing it in contact with the flesh of the animal. Various expedients have been utilized to eliminate the contamination of the carcass with dirt and manure, such as placing a piece of fat between the ends of the pritch stick and the carcass.

It will be noted that the embodiment of the present invention, shown in the drawings, comprises two wings somewhat different in shape, each wing presenting a contour which has been designed to permit the most efficient handling of the carcass.

Figure 8 shows the contour of the wings at that portion which is designed to support the shoulders or fore-quarters and prevent the carcass from rolling over on either side, allowing breast opening and brisket sawing work to be properly accomplished.

Figure 9 illustrates the contour just behind the shoulders showing that the contour drops off to permit the butchers adequate opportunity to remove the skin on both shoulders and around the forelegs.

Figure 10 shows that at this point both wings are cut lower to the floor permitting the floorsmen to skin the hide from around the shoulder blades and skin out the rose; that is, so to remove the hide as to leave the rose on the carcass and avoid taking it off with the hide.

Figure 11 shows that the contour at this point is slightly raised above the point shown in Figure 10 to hold the carcass firmly while the butchering work is being carried on.

The wings begin to flare out at that portion, the contour of which is shown in Figure 12, since at this point the carcass lying on its back spreads and widens. This flare-out permits the warm beef to rest so that the hide is free and loose, making skilled butcher knife work less laborious.

The widening continues at that portion, the contour of which is shown in Figure 13, and the wings are built higher to hold the rump or hindquarters of cattle firmly in order that the butchers may efficiently open the belly and saw or cut open the crotch bone, skin down the sides without danger of the carcass moving unduly and to avoid slipping or rolling of the carcass which might result in injury to the workmen or to the hide.

It will be seen in Figure 14 that wing 1 begins to flare out very materially. This plow-shaped end of wing 1 is designed to automatically turn the carcass on its right side as it is being pulled out by the shackle chain for the further operations of skinning which are performed on the half hoist permitting labor saving and keeping the meat free of fouling since it rests on the hide in hoisting and does not come in contact with the floor.

The carcass 4 suspended from shackle chain 5 is lowered into the cradle as shown in Figure 2. Shackle chain 5 is then removed so that the carcass is in the position shown in Figure 3. After the operations in the cradle have been performed the hind feet are again secured by the shackle chain and the carcass is drawn out on the half hoist.

In practice is has been found that the cradle permits skinning with a minimum of damage to the hide. The position of the carcass lying in the cradle permits the hide to hang loosely and uniformly on the sides of the carcass. This is conducive to better knife work and removes any apprehension of the operator that a pritch stick might slip while he is working.

In addition to this, the cradle eliminates the necesity of the butcher working about the carcass changing the pritch sticks when he is skinning out the sides and when dropping the carcass into the cradle.

As has been pointed out, the plow-shaped flare on wing 1 automatically turns the carcass over into the proper position on the first hoist for the butcher to skin out the rounds and rump. The device also leaves the carcass in the proper position so that the belly can be ripped open in the proper way from the brisket clear through to the crotch, making more uniform work for the breast sawers and crotch openers.

I claim:

1. A cattle skinning cradle comprising two substantially parallel spaced wings mounted upon a plane surface, said wings being of relatively great height at one end, succeeded by three relatively lower portions of successively increasing height.

2. A cattle skinning cradle comprising two substantially parallel spaced wings mounted upon a plane surface, said wings being of relatively great height at one end, succeeded by three relatively lower portions of successively increasing height, one of said wings continuing beyond and flaring outwardly at the other end.

LAURANCE B. WHITMARSH.